United States Patent
Khan et al.

(10) Patent No.: US 9,312,800 B2
(45) Date of Patent: Apr. 12, 2016

(54) CONTROL TECHNIQUES FOR AN INTERIOR PERMANENT MAGNET SYNCHRONOUS MOTOR OF AN ELECTRIFIED VEHICLE

(71) Applicants: Ahmad Arshan Khan, Troy, MI (US); Young Joo Lee, Rochester, MI (US); Bing Cheng, West Bloomfield, MI (US); Hua Bai, Flint, MI (US); Fei Yang, Flint, MI (US); Allan Taylor, Flint, MI (US)

(72) Inventors: Ahmad Arshan Khan, Troy, MI (US); Young Joo Lee, Rochester, MI (US); Bing Cheng, West Bloomfield, MI (US); Hua Bai, Flint, MI (US); Fei Yang, Flint, MI (US); Allan Taylor, Flint, MI (US)

(73) Assignees: FCA US LLC, Auburn Hills, MI (US); Kettering University, Flint, MI (US)

(*) Notice: Subject to any disclaimer, the term of this patent is extended or adjusted under 35 U.S.C. 154(b) by 0 days.

(21) Appl. No.: 14/467,455

(22) Filed: Aug. 25, 2014

(65) Prior Publication Data

US 2016/0056744 A1    Feb. 25, 2016

(51) Int. Cl.
*H02P 1/00* (2006.01)
*H02P 21/14* (2006.01)

(52) U.S. Cl.
CPC .................................... *H02P 21/14* (2013.01)

(58) Field of Classification Search
CPC ........... H02P 27/08; H02P 21/06; H02P 6/10; H02P 21/0003; H02P 21/0035; H02P 21/14; H02P 27/12; G01K 13/10; G01K 7/42; G01R 31/3624; G01R 31/3662; H01M 10/486; B60K 6/48; B60L 11/14; B60L 15/20
USPC .......... 318/400.02, 400.07, 400.23, 432, 801, 318/811, 139
See application file for complete search history.

(56) References Cited

U.S. PATENT DOCUMENTS

| 7,518,335 | B2 * | 4/2009 | West et al. ..................... 318/811 |
| 7,652,443 | B2 | 1/2010 | Schulz et al. |
| 7,952,308 | B2 * | 5/2011 | Schulz et al. ............. 318/400.23 |
| 8,583,265 | B1 | 11/2013 | Schulz et al. |
| 8,684,596 | B2 * | 4/2014 | Nishi et al. ..................... 374/152 |
| 2008/0094023 | A1 * | 4/2008 | West et al. ..................... 318/811 |
| 2009/0251096 | A1 * | 10/2009 | Schulz et al. ................. 318/801 |
| 2011/0109155 | A1 * | 5/2011 | Anwar et al. .................. 307/9.1 |
| 2012/0099618 | A1 * | 4/2012 | Nishi et al. ..................... 374/152 |
| 2013/0063057 | A1 * | 3/2013 | Takahashi ................ 318/400.02 |

\* cited by examiner

*Primary Examiner* — Paul Ip
(74) *Attorney, Agent, or Firm* — Ralph E. Smith

(57) ABSTRACT

A system and method for controlling an interior permanent magnet synchronous motor (IPMSM) are presented. In an exemplary implementation, phase current ripple estimation techniques are utilized for variable frequency switching pulse-width modulation control of the IPMSM. In one implementation, the method includes controlling a three-phase inverter based on an initial switching frequency to generate a three-phase alternating current (AC) voltage for the IPMSM. Transformed voltages are determined in a rotating reference frame based on the three-phase AC voltage in the stationary reference frame. Current ripples are determined in the rotating reference frame based on the transformed voltages. Phase current ripples are determined in the stationary reference frame based on the current ripples in the rotating reference frame. A modified switching frequency for the three-phase inverter is determined based on the initial switching frequency and the phase current ripples. The three-phase inverter is then controlled based on the modified switching frequency.

19 Claims, 3 Drawing Sheets

CONTROL TECHNIQUES FOR AN INTERIOR PERMANENT MAGNET SYNCHRONOUS MOTOR OF AN ELECTRIFIED VEHICLE

FIELD

The present disclosure relates generally to electrified vehicles and, more particularly, to control techniques for an interior permanent magnet synchronous motor of an electrified vehicle.

BACKGROUND

An electrified vehicle includes a power source (e.g., a battery system), an inverter, and an electric motor. The inverter includes a plurality of switches configured to convert a direct current from the power source to alternating phase currents for the electric motor (e.g., three phase currents). Most conventional inverters use constant switching frequency pulse-width modulation (CSFPWM) control, which could cause a phase current ripple to be over-tuned, thereby decreasing efficiency. Thus, while conventional inverter control methods work for their intended purpose, there remains a need for improvement in the relevant art.

SUMMARY

In one aspect, an electrified vehicle is provided in accordance with the teachings of the present disclosure. In an exemplary implementation, the electrified vehicle includes an interior permanent magnet synchronous motor (IPMSM) configured to generate drive torque in response to a three-phase AC voltage, a power source configured to generate a direct current (DC) voltage, and a three-phase inverter configured to convert the DC voltage to the three-phase AC voltage for the IPMSM. The electrified vehicle also includes a controller configured to: control the three-phase inverter based on an initial switching frequency to generate the three-phase AC voltage, determine transformed currents in a rotating reference frame based on a three-phase AC current in a stationary reference frame, determine current ripples in the rotating reference frame based on the transformed current, determine a modified switching frequency for the three-phase inverter based on the initial switching frequency and the current ripples, and perform variable switching frequency pulse-width modulation (VSFPWM) control of the three-phase inverter based on the modified switching frequency.

In another aspect, a method is provided in accordance with the teachings of the present disclosure. In an exemplary implementation, the method includes controlling, by a controller of an electrified vehicle, a three-phase inverter of the electrified vehicle based on an initial switching frequency to generate a three-phase AC voltage for an IPMSM of the electrified vehicle. The method includes determining, at the controller, transformed voltages in a rotating reference frame based on the three-phase AC voltage in the stationary reference frame. The method includes determining, at the controller, voltage ripples in the rotating reference frame based on the transformed voltages. The method includes determining, at the controller, current ripples in the rotating reference frame based on the voltage ripples. The method includes determining, at the controller, phase current ripples in the stationary reference frame based on the current ripples in the rotating reference frame. The method includes determining, at the controller, a modified switching frequency for the three-phase inverter based on the initial switching frequency and the phase current ripples. The method also includes performing, by the controller, VSFPWM control of the three-phase inverter based on the modified switching frequency.

In one exemplary implementation, the transformed voltages are obtained by applying a Park transformation to convert the three-phase AC voltage from the stationary reference frame to the rotating reference, and the phase current ripples are obtained by applying an inverse Park transformation to convert the current ripples from the rotating reference frame to the stationary reference frame.

In some implementations, a maximum phase current ripple for VSFPWM control of the three-phase inverter is determined, and the modified switching frequency is determined based on the maximum phase current ripple and the initial switching frequency. In one exemplary implementation, the maximum phase current ripple for VSFPWM is a same maximum phase current ripple as for constant switching frequency pulse-width modulation (CSFPWM) control of the three-phase inverter.

In some implementations, the modified switching frequency is determined based on the maximum phase current ripple and the initial switching frequency by: comparing each phase current ripple to the maximum phase current ripple, and determining the modified switching frequency based on the initial switching frequency and the comparing. In one exemplary implementation, the modified switching frequency is determined based on the initial switching frequency and the comparing by: increasing the initial switching frequency when one of the phase current ripples is greater than or within a first predetermined threshold and the maximum phase current ripple, and decreasing the initial switching frequency when one of the phase current ripples is less than the first predetermined threshold or a second predetermined threshold that is less than the first predetermined threshold.

In some implementations, the modified switching frequency is constrained within a predetermined range of switching frequencies, and a fundamental frequency of the IPMSM is substantially less than the predetermined range of switching frequencies. In one exemplary implementation, the predetermined range of switching frequencies is approximately 8.6 kilohertz (kHz) to 10 kHz.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Two types of an electric motor for an electrified vehicle are the surface-mounted permanent magnet synchronous motor (SPMSM) and the interior permanent magnet synchronous motor (IPMSM). For the SPMSM, Thevenin equivalent circuits could be utilized to analyze phase current ripples. The IPMSM, however, is capable of generating larger amounts of torque than the SPMSM, which makes it more suitable for electrified vehicles. Consequently, the phase inductance for the IPMSM is position related and thus non-linear and time-variant, and therefore these Thevenin equivalent circuit estimation techniques are difficult to be utilized.

Accordingly, phase current ripple estimation techniques for variable switching frequency pulse-width modulation (VSFPWM) control of an IPMSM are presented. These techniques involve determining phase voltages, converting the phase voltages from the stationary reference frame to the rotating reference frame to obtain transformed voltages, and determining voltage ripples from the transformed voltages and current ripples from the voltage ripples. The techniques also involve converting the current ripples from the rotating reference frame to the stationary reference frame to obtain phase current ripples, determining a modified switching frequency for inverter control based on the phase current ripples, and performing VSFPWM inverter control based on the modified switching frequency.

Figure 1:
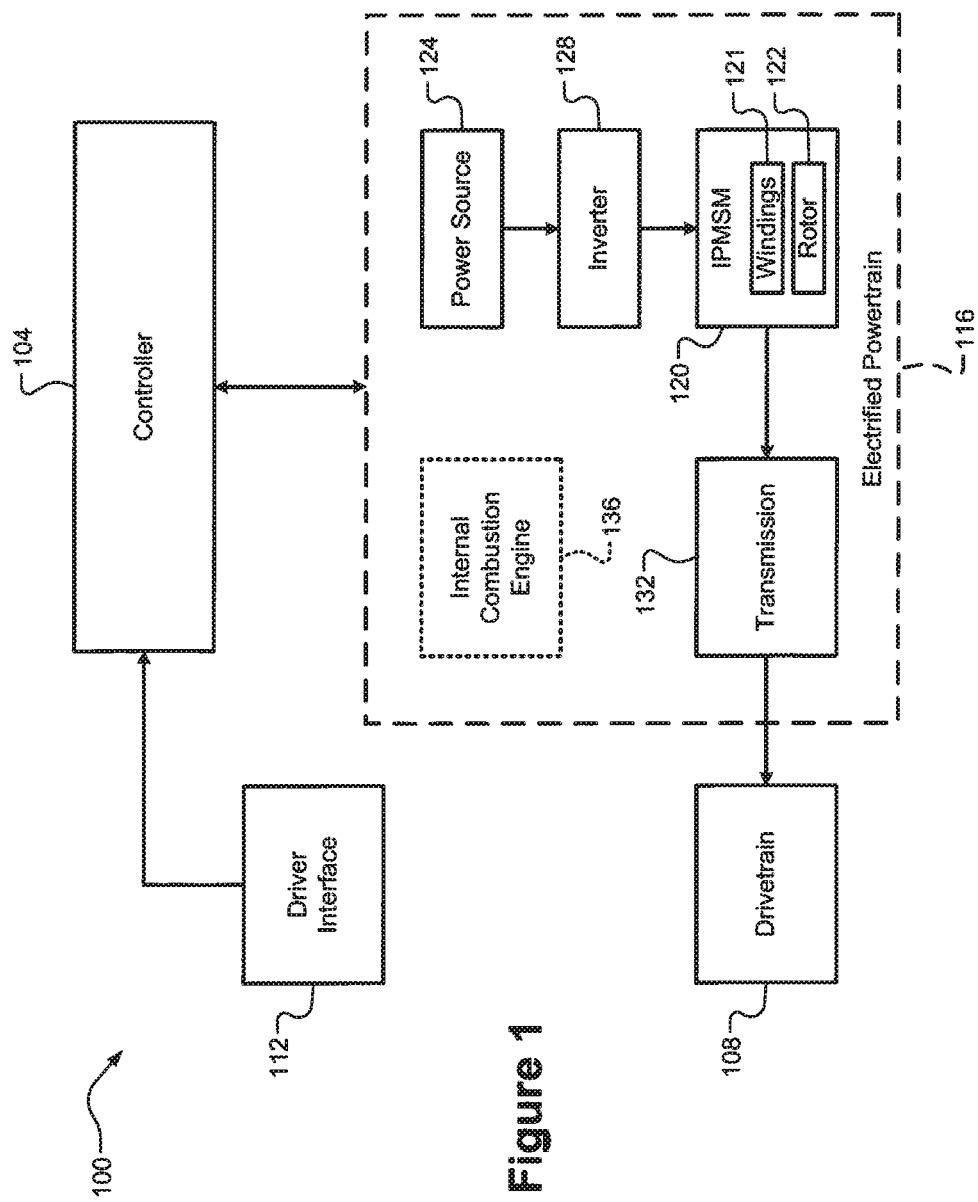
FIG. 1 is an example functional block diagram of an electrified vehicle according to the principles of the present disclosure.

Referring now to FIG. 1, a functional block diagram of an electrified vehicle (EV) 100 is illustrated. Examples of the electrified vehicle 100 include a battery electric vehicle (BEV), an extended-range electric vehicle (EREV), a fuel cell electric vehicle (FCEV), and a hybrid electric vehicle (HEV) such as a plug-in HEV (PHEV) and a non-plug-in HEV. The electrified vehicle 100 could also be another suitable electrified vehicle. The electrified vehicle 100 includes a controller 104 that controls operation of the electrified vehicle 100. In one exemplary implementation, the controller 104 includes at least one processor configured to execute a set of instructions to perform at least a portion of the techniques of the present disclosure.

For example, the controller 104 may include a single processor or a plurality of processors operating in a parallel or distributed architecture. It will be appreciated that while the controller 104 is illustrated as a vehicle controller, the controller 104 could alternatively be a separate controller such as a motor controller. The controller 104 controls drive torque supplied to a drivetrain 108 (one or more wheels, a differential, etc.) in response to a torque request via a driver interface 112. The driver interface 112 is one or more devices configured to allow a driver of the electrified vehicle 100 to input a vehicle torque request, e.g., an accelerator pedal. The drive torque is supplied to the drivetrain 108 from an electrified powertrain 116.

The electrified powertrain 116 is a high power electrified powertrain capable of generating enough drive torque to propel the electrified vehicle 100. In one exemplary implementation, the electrified powertrain 116 for a BEV includes an IPMSM 120 comprising a plurality (e.g., three) windings or coils 121 and a rotor 122, a power source 124, an inverter 128, and a transmission 132. The power source 124 is any suitable power source configured to generate a direct current (DC) voltage for the inverter 128. In one exemplary implementation, the power source 124 is a battery system and the inverter 128 is a three-phase inverter. The transmission 132 transfers drive torque generated by the IPMSM 120 to the drivetrain 108.

In some implementations (EREV, HEV, etc.), the electrified powertrain 116 could optionally include an internal combustion engine 136. The internal combustion engine 136 combusts a mixture of air and fuel, e.g., gasoline, within cylinders to rotatably drive a crankshaft and generate drive torque. In one implementation, the internal combustion engine 136 is coupled to an electrically variable transmission (EVT) 132 utilizing multiple electric motors and is utilized to both provide motive power and recharge the power source 124, e.g., during driving of the electrified vehicle 100. For example, the IPMSM 120 could provide motive power and another suitable electric motor could recharge the power source 124.

Figure 2:
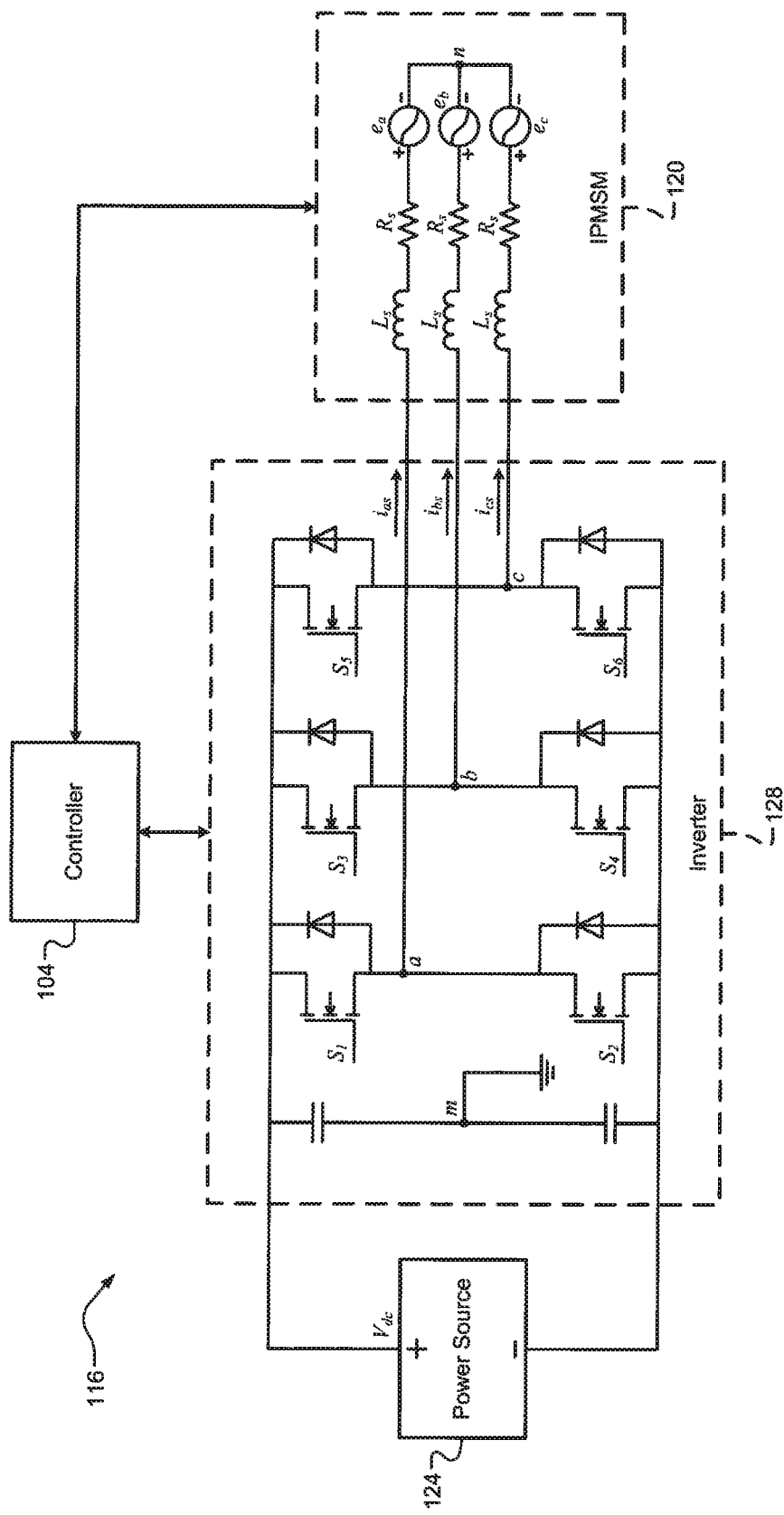
FIG. 2 is an example partial circuit diagram of an electrified powertrain according to the principles of the present disclosure.

Referring now to FIG. 2, an example partial circuit diagram of the electrified powertrain 116 is illustrated. Specifically, equivalent circuit diagrams are illustrated for the inverter 128 and the IPMSM 120. Point m is a midpoint of the inverter 128 and the DC source voltage ($V_{dc}$) from the power source 124. Point n is a neutral point of the IPMSM 120. In one exemplary implementation, the IPMSM 120 is a three-phase, Y-connected IPMSM having the neutral point n. The inverter 120 outputs AC voltages ($v_{am}$, $v_{bm}$, $v_{bc}$) with respect to the DC source midpoint m. AC voltage $v_{am}$ corresponds to a first phase A and varies based on states of switches $S_1$ and $S_4$, AC voltage $v_{bm}$ corresponds to a second phase B and varies based on states of switches $S_2$ and $S_5$, and AC voltage $v_{cm}$ corresponds to a third phase C and varies based on states of switches $S_3$ and $S_6$. In one exemplary implementation, the switches $S_1$-$S_6$ are transistors, such as insulated gate bipolar transistors (IGBTs).

Each of the AC voltages $v_{am}$, $v_{bm}$, $v_{cm}$ is composed of an average component ($V_m$) and a ripple component ($\Delta v_m$). Using AC voltage $v_{am}$ as an example, this relationship is expressed as follows:

$$v_{am} = V_{am} + \Delta v_{am} \quad (1),$$

where $$V_{am} = D_a \cdot \frac{V_{dc}}{2} + (1 - D_a) \cdot \left(-\frac{V_{dc}}{2}\right) = (2D_a - 1) \cdot \frac{V_{dc}}{2}, \quad (2)$$

and $$\Delta v_{am} = \begin{cases} -\frac{V_{dc}}{2} - V_{am} = -V_{dc} D_a & \text{in Vector 0, } S_1 \text{ is on} \\ \frac{V_{dc}}{2} - V_{am} = V_{dc}(1 - D_a) & \text{in Vector 1, } S_6 \text{ is on} \end{cases}, \quad (3)$$

where $D_a$ is the phase A voltage duty cycle. It should also be noted that the voltage ripples for phases B and C could be similarly derived. As previously mentioned, the phase inductance $L_s$ for the IPMSM 120 is position-related. More specifically, the phase inductance $L_s$ varies with respect to a position of the rotor 122 of the IPMSM 120. Thus, instead of calculating the current ripples in the stationary a-b-c reference frame directly, the current ripples are calculated herein in the rotating d-q reference frame as discussed in greater detail below.

Initially, the controller 104 controls switching in the inverter 128 using an initial switching frequency ($sf_i$). This initial switching frequency sfi could be based on a variety of operating parameters of the electrified vehicle 116, such as a torque request and/or parameters of the power source 124 (state of charge, state of power, state of health, etc.). After controlling switching in the inverter 128 using the initial switching frequency $sf_i$, the controller 104 then determines transformed voltages ($v_d$, $v_q$). More specifically, the controller 104 applies a Park transformation to transform the three phase voltages $v_a$, $v_b$, $v_c$ from the stationary a-b-c reference frame to the rotating d-q reference frame as expressed below:

$$\begin{bmatrix} v_d \\ v_q \\ 0 \end{bmatrix} = T_{abc \to dq0} \begin{bmatrix} v_{as} \\ v_{bs} \\ v_{cs} \end{bmatrix} = T_{abc \to dq0} \begin{bmatrix} v_{an} \\ v_{bn} \\ v_{cn} \end{bmatrix}. \quad (4)$$

In one exemplary implementation, the Park transformation matrix $T_{abc \to dq0}$ is as follows:

$$T_{abc \to dq0} = \frac{2}{3} \begin{bmatrix} \cos\theta & \cos(\theta - 2\pi/3) & \cos(\theta - 4\pi/3) \\ -\sin\theta & -\sin(\theta - 2\pi/3) & -\sin(\theta - 4\pi/3) \\ 1/2 & 1/2 & 1/2 \end{bmatrix}, \quad (5)$$

where θ represents a rotational angle of a north pole of a magnet of the rotor 122 of the IPMSM 120. By applying the Park transformation, the following equations are obtained:

$$v_d = \frac{2}{3}[v_{an}\cos\theta + v_{bn}\cos(\theta - 2\pi/3) + v_{cn}\cos(\theta - 4\pi/3) = \quad (6)$$
$$\frac{2}{3}[(v_{bm} - v_{am})\cos(\theta - 2\pi/3) + (v_{cm} - v_{am})\cos(\theta - 4\pi/3)],$$

and $$v_q = -\frac{2}{3}[v_{an}\sin\theta + v_{bn}\sin(\theta - 2\pi/3) + v_{cn}\sin(\theta - 4\pi/3) = \quad (7)$$
$$-\frac{2}{3}[(v_{bm} - v_{am})\sin(\theta - 2\pi/3) + (v_{cm} - v_{am})\sin(\theta - 4\pi/3)],$$

where $v_{an}$, $v_{bn}$, $v_{cn}$ represent the phase voltages with respect to neutral point n, and where $v_{am}$, $v_{bm}$, $v_{cm}$ represent the phase voltages with respect to DC midpoint m.

After obtaining the d-axis voltage $v_d$ and the q-axis voltage $v_q$ as described above, the controller 104 is configured to separate them into their fundamental components ($V_d$, $V_q$) and their ripple components ($\Delta v_d$, $\Delta v_q$) as follows:

$$V_d = \frac{2}{3}[(V_{bm} - V_{am})\cos(\theta - 2\pi/3) + (V_{cm} - V_{am})\cos(\theta - 4\pi/3)], \quad (8)$$

$$\Delta v_d = \frac{2}{3}[(\Delta v_{bm} - \Delta v_{am})\cos(\theta - 2\pi/3) + (\Delta v_{cm} - \Delta v_{am})\cos(\theta - 4\pi/3)], \quad (9)$$

$$V_q = -\frac{2}{3}[(V_{bm} - V_{am})\sin(\theta - 2\pi/3) + (V_{cm} - V_{am})\sin(\theta - 4\pi/3)], \text{ and} \quad (10)$$

$$\Delta v_q = \quad (11)$$
$$-\frac{2}{3}[(\Delta v_{bm} - \Delta v_{am})\sin(\theta - 2\pi/3) + (\Delta v_{cm} - \Delta v_{am})\sin(\theta - 4\pi/3)],$$

where $V_{am}$, $V_{bm}$, $V_{cm}$ represent the fundamental components of the phase voltages with respect to the DC midpoint m in the stationary a-b-c reference frame and $\Delta v_{am}$, $\Delta v_{bm}$, $\Delta v_{cm}$ represent the ripple components of the phase voltages with respect to the DC midpoint m in the stationary a-b-c reference frame.

The controller 104 is also configured to determine current ripples ($\Delta i_d$, $\Delta i_q$) in the rotating d-q reference frame as follows:

$$v_d = R_s i_d + L_d \frac{di_d}{dt} - \omega_r L_q i_q, \quad (12)$$

and $$v_q = R_s i_q + L_q \frac{di_q}{dt} + \omega_r(L_d i_d + \lambda_m), \quad (13)$$

where $R_s$, $L_d$, $L_q$, $\lambda_m$ are motor parameters (resistances, inductances, and rotor magnet flux linkage, respectively) and $\omega_r$ is rotor speed (e.g., in electrical radians/second), each of which is assumed to be constant within one switching period. These parameters could be measured using sensor(s) and/or modeled based on other known parameters. These equations are then substituted back into the fundamental voltage component ($V_d$, $V_q$) and voltage ripple component ($\Delta v_d$, $\Delta v_q$) equations as follows:

$$V_d = R_s I_d + L_d \frac{dI_d}{dt} - \omega_r L_q I_q, \quad (14)$$

$$\Delta v_d = R_s \Delta i_d + L_d \frac{d\Delta i_d}{dt} - \omega_r L_q \Delta i_q, \quad (15)$$

$$V_q = R_s I_q + L_q \frac{dI_q}{dt} + \omega_r(L_d I_d + \lambda_m), \quad (16)$$

and $$\Delta v_q = R_s \Delta i_q + L_q \frac{d\Delta i_q}{dt} + \omega_r L_d \Delta i_d, \quad (17)$$

where $I_d$, $I_q$ represent fundamental current components in the rotating d-q reference frame and $\Delta i_d$, $\Delta i_q$ represent ripple current components in the rotating d-q reference frame.

By ignoring the voltage drops across the resistances as well as cross-coupled speed voltage drops of the windings/coils 121 of the IPMSM 120, Equations (15) and (17) are simplified as follows:

$$\Delta v_d = L_d \frac{d\Delta i_d}{dt}, \quad (18)$$

and $$\Delta v_q = L_q \frac{d\Delta i_q}{dt}. \quad (19)$$

Equations (9) and (11) are then substituted into Equations (18) and (19) to obtain the following:

$$L_d \frac{d\Delta i_d}{dt} = \frac{2}{3}[(\Delta v_{bm} - \Delta v_{am})\cos(\theta - 2\pi/3) + (\Delta v_{cm} - \Delta v_{am})\cos(\theta - 4\pi/3)], \quad (20)$$

and $$L_q \frac{d\Delta i_q}{dt} = -\frac{2}{3}[(\Delta v_{bm} - \Delta v_{am})\sin(\theta - 2\pi/3) + (\Delta v_{cm} - \Delta v_{am})\sin(\theta - 4\pi/3)], \quad (21)$$

which are then solved as follows:

$$\frac{d\Delta i_q}{dt} = \frac{2}{3L_d}[(\Delta v_{bm} - \Delta v_{am})\cos(\theta - 2\pi/3) + (\Delta v_{cm} - \Delta v_{am})\cos(\theta - 4\pi/3)], \quad (22)$$

and $$\frac{d\Delta i_q}{dt} = \frac{2}{3L_d}[(\Delta v_{bm} - \Delta v_{am})\sin(\theta - 2\pi/3) + (\Delta v_{cm} - \Delta v_{am})\sin(\theta - 4\pi/3)]. \quad (23)$$

The controller 104 is configured to then determine the phase current ripples $\Delta i_a$, $\Delta i_b$, $\Delta i_c$. More specifically, the controller 104 applies an inverse Park transformation to transform the ripple currents $i_d$, $i_q$ from the rotating d-q reference frame to the stationary a-b-c reference frame as expressed below:

$$\begin{bmatrix} i_{as} \\ i_{bs} \\ i_{cs} \end{bmatrix} = T_{dq0 \to abc} \begin{bmatrix} i_d \\ i_q \\ i_0 \end{bmatrix}, \quad (24)$$

where $i_0$ represents a zero-sequence current. In one exemplary implementation, the inverse Park transformation matrix $T_{dq0 \to abc}$ is as follows:

$$T_{dq0 \to abc} = \begin{bmatrix} \cos\theta & -\sin\theta & 1 \\ \cos(\theta - 2\pi/3) & -\sin(\theta - 2\pi/3) & 1 \\ \cos(\theta - 4\pi/3) & -\sin(\theta - 4\pi/3) & 1 \end{bmatrix}. \quad (25)$$

Therefore:

$$\begin{bmatrix} \Delta i_{as} \\ \Delta i_{bs} \\ \Delta i_{cs} \end{bmatrix} = \begin{bmatrix} \cos\theta & -\sin\theta & 1 \\ \cos(\theta - 2\pi/3) & -\sin(\theta - 2\pi/3) & 1 \\ \cos(\theta - 4\pi/3) & -\sin(\theta - 4\pi/3) & 1 \end{bmatrix} \begin{bmatrix} \Delta i_d \\ \Delta i_q \\ \Delta i_0 \end{bmatrix}. \quad (26)$$

By assuming a balanced operational condition where the zero-sequence current $i_0$ is zero, Equation (26) is solved as follows:

$$\Delta i_{bs} = \Delta i_d \cos\theta - \Delta i_q \sin\theta \quad (27),$$

$$\Delta i_{bs} = \Delta i_d \cos(\theta - 2\pi/3) - \Delta i_q \sin(\theta - 2\pi/3) \quad (28), \text{ and}$$

$$\Delta i_{cs} = \Delta i_d \cos(\theta - 4\pi/3) - \Delta i_q \sin(\theta - 4\pi/3) \quad (29).$$

By substituting Equations (22)-(23) to (27)-(28), the following equations are obtained for predicting phase current ripples ($d\Delta i_a/dt$, $d\Delta i_b/dt$, $d\Delta i_c/dt$ below):

$$\frac{d\Delta i_a}{dt} = \frac{2}{3L_d}[(\Delta v_{bm} - \Delta v_{am})\cos(\theta - 2\pi/3) + (\Delta v_{cm} - \Delta v_{am})\cos(\theta - 4\pi/3)]\cos\theta + \frac{2}{3L_q}[(\Delta v_{bm} - \Delta v_{am})\sin(\theta - 2\pi/3) + (\Delta v_{cm} - \Delta v_{am})\sin(\theta - 4\pi/3)]\sin\theta, \quad (30)$$

$$\frac{d\Delta i_b}{dt} = \frac{2}{3L_d}[(\Delta v_{bm} - \Delta v_{am})\cos(\theta - 2\pi/3) + (\Delta v_{cm} - \Delta v_{am})\cos(\theta - 4\pi/3)]\cos(\theta - 2\pi/3) + \frac{2}{3L_q}[(\Delta v_{bm} - \Delta v_{am})\sin(\theta - 2\pi/3) + (\Delta v_{cm} - \Delta v_{am})\sin(\theta - 4\pi/3)]\sin(\theta - 2\pi/3), \quad (31)$$

$$\frac{d\Delta i_c}{dt} = \frac{2}{3L_d}[(\Delta v_{bm} - \Delta v_{am})\cos(\theta - 2\pi/3) + (\Delta v_{cm} - \Delta v_{am})\cos(\theta - 4\pi/3)]\cos(\theta - 4\pi/3) + \frac{2}{3L_q}[(\Delta v_{bm} - \Delta v_{am})\sin(\theta - 2\pi/3) + (\Delta v_{cm} - \Delta v_{am})\sin(\theta - 4\pi/3)]\sin(\theta - 4\pi/3). \quad (32)$$

The controller 104 is configured to utilize these Equations (30)-(32) (e.g., in conjunction with Equations (1)-(3)) to predict the phase current ripples $\Delta i_a$, $\Delta i_b$, $\Delta i_c$. Based on these phase current ripples, the controller 104 is configured to adjust the switching frequency of the inverter 128. More specifically, the controller 104 could obtain a modified switching frequency ($sf_m$) by increasing or decreasing the initial switching frequency $sf_i$. In one exemplary implementation, the controller 104 is configured to compare each of the phase current ripples $\Delta i_a$, $\Delta i_b$, $\Delta i_c$ to a maximum phase current ripple ($\Delta i^*$) for VSFPWM control of the inverter 128. For example only, this maximum phase current ripple $\Delta i^*$ could be the same maximum phase current ripple used in constant switching frequency pulse-width modulation (CSFPWM) control. For example, the maximum phase current ripple Δi* could be based on parameters of the IPMSM 120 and/or parameters of the electrified vehicle 100.

In one exemplary implementation, the controller 104 is configured to increase the initial switching frequency $sf_i$ when one of the phase current ripples $\Delta i_a$, $\Delta i_b$, $\Delta i_c$ is greater than or between a first predetermined threshold and the maximum phase current ripple Δi* to obtain the modified switching frequency $sf_m$. Similarly, the controller 104 could also be configured to decrease the initial switching frequency $sf_i$ when one of the phase current ripples $\Delta i_a$, $\Delta i_b$, $\Delta i_c$ is less than the first predetermined threshold or a second predetermined threshold that is less than the first predetermined threshold to obtain the modified switching frequency $sf_m$. In one exemplary implementation, the controller 104 is configured to constrain the modified switching frequency $sf_m$ within a predetermined range of switching frequencies. For example only, the predetermined range of switching frequencies could be approximately 8.6 kilohertz (kHz) to 10 kHz, which is substantially greater than a fundamental frequency of the IPMSM 120.

Figure 3:
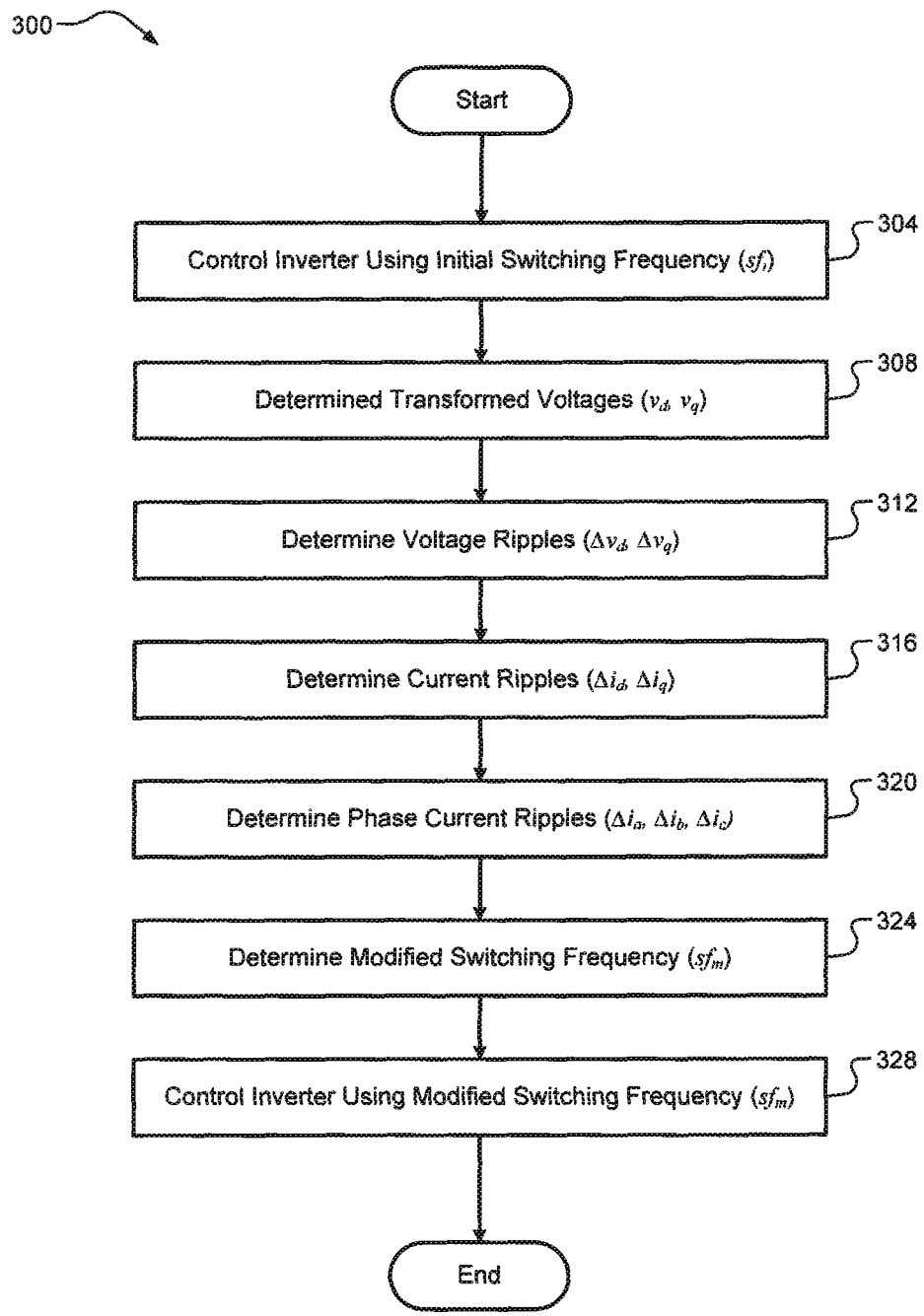
FIG. 3 is a flow diagram of an example control technique for an interior permanent magnet synchronous motor of an electrified vehicle according to the principles of the present disclosure.

Referring now to FIG. 3, an example flow diagram of a method 300 for phase current ripple estimation for VSFPWM control of an IPMSM for an electrified vehicle is illustrated. At 304, the controller 104 controls the three-phase inverter 128 based on the initial switching frequency $sf_i$ to generate the three-phase AC voltage $v_a$, $v_b$, $v_c$. At 308, the controller 104 determines the transformed voltages $v_d$, $v_q$ by applying the Park transformation $T_{abc \rightarrow dq0}$ to convert the three-phase AC voltage from the stationary a-b-c reference frame to the rotating d-q reference frame. At 312, the controller 104 determines voltage ripples $\Delta v_d$, $\Delta v_q$ in the rotating d-q reference frame based on the transformed voltages $v_d$, $v_q$. At 316, the controller 104 determines current ripples in the rotating d-q reference frame based on the voltage ripples $\Delta v_d$, $\Delta v_q$.

At 320, the controller 104 determines phase current ripples $\Delta i_a$, $\Delta i_b$, $\Delta i_c$ by applying the inverse Park transformation $T_{dq0 \rightarrow abc}$ to convert the current ripples from the rotating d-q reference frame to the stationary reference frame a-b-c. At 324, the controller 104 determines the modified switching frequency $sf_m$ for the three-phase inverter 128 based on the initial switching frequency $sf_i$ and the phase current ripples $\Delta i_a$, $\Delta i_b$, $\Delta i_c$. In one exemplary implementation, this includes comparing the phase current ripples $\Delta i_a$, $\Delta i_b$, $\Delta i_c$ to the maximum phase current ripple Δi*. At 328, the controller 104 performs VSFPWM control of the three-phase inverter 128 based on the modified switching frequency $sf_m$. The method 300 then ends or returns to 304.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An electrified vehicle, comprising:
   an interior permanent magnet synchronous motor (IPMSM) configured to generate drive torque in response to a three-phase AC voltage;
   a power source configured to generate a direct current (DC) voltage;
   a three-phase inverter configured to convert the DC voltage to the three-phase AC voltage for the IPMSM; and
   a controller comprising a memory configured to store a set of instructions and one or more processors configured to execute the set of instructions, which causes the controller to perform operations comprising:
   control the three-phase inverter based on an initial switching frequency to generate the three-phase AC voltage;
   determine transformed voltages in a rotating reference frame based on the three-phase AC voltage in a stationary reference frame;
   determine voltage ripples in the rotating reference frame based on the transformed voltages;
   determine current ripples in the rotating reference frame based on the voltage ripples;
   determine phase current ripples in the stationary reference frame based on the current ripples in the rotating reference frame;
   determine a modified switching frequency for the three-phase inverter based on the initial switching frequency and the phase current ripples; and
   perform variable switching frequency pulse-width modulation (VSFPWM) control of the three-phase inverter based on the modified switching frequency.

2. The electrified vehicle of claim 1, wherein the controller is configured to obtain the transformed voltages by applying a Park transformation to convert the three-phase AC voltage from the stationary reference frame to the rotating reference, and wherein the controller is configured to obtain the phase current ripples by applying an inverse Park transformation to convert the current ripples from the rotating reference frame to the stationary reference frame.

3. The electrified vehicle of claim 1, wherein the controller is further configured to:
   determine a maximum phase current ripple for VSFPWM control of the three-phase inverter; and
   determine the modified switching frequency based on the maximum phase current ripple and the initial switching frequency.

4. The electrified vehicle of claim 3, wherein the maximum phase current ripple for VSFPWM is a same maximum phase current ripple as for constant switching frequency pulse-width modulation (CSFPWM) control of the three-phase inverter.

5. The electrified vehicle of claim 3, wherein the controller is configured to determine the modified switching frequency based on the maximum phase current ripple and the initial switching frequency by:
   comparing each phase current ripple to the maximum phase current ripple; and
   determining the modified switching frequency based on the initial switching frequency and the comparing.

6. The electrified vehicle of claim 5, wherein the controller is configured to determine the modified switching frequency based on the initial switching frequency and the comparing by:
   increasing the initial switching frequency when one of the phase current ripples is greater than or within a first predetermined threshold and the maximum phase current ripple; and
   decreasing the initial switching frequency when one of the phase current ripples is less than the first predetermined threshold or a second predetermined threshold that is less than the first predetermined threshold.

7. The electrified vehicle of claim 1, wherein the controller is configured to constrain the modified switching frequency within a predetermined range of switching frequencies.

8. The electrified vehicle of claim 7, wherein a fundamental frequency of the IPMSM is substantially less than the predetermined range of switching frequencies.

9. The electrified powertrain of claim 7, wherein the predetermined range of switching frequencies is approximately 8.6 kilohertz (kHz) to 10 kHz.

10. The electrified vehicle of claim 1, wherein the power source is a battery system, and wherein the electrified vehicle is one of a battery electric vehicle (BEV) and a hybrid electric vehicle (HEV).

11. A method, comprising:
controlling, by a controller of an electrified vehicle, a three-phase inverter of the electrified vehicle based on an initial switching frequency to generate a three-phase alternating current (AC) voltage for an interior permanent magnet synchronous motor (IPMSM) of the electrified vehicle;
determining, at the controller, transformed voltages in a rotating reference frame based on the three-phase AC voltage in a stationary reference frame;
determining, at the controller, voltage ripples in the rotating reference frame based on the transformed voltages;
determining, at the controller, current ripples in the rotating reference frame based on the voltage ripples;
determining, at the controller, phase current ripples in the stationary reference frame based on the current ripples in the rotating reference frame;
determining, at the controller, a modified switching frequency for the three-phase inverter based on the initial switching frequency and the phase current ripples; and
performing, by the controller, variable switching frequency pulse-width modulation (VSFPWM) control of the three-phase inverter based on the modified switching frequency.

12. The method of claim 11, wherein the transformed voltages are obtained by applying a Park transformation to convert the three-phase AC voltage from the stationary reference frame to the rotating reference frame, and wherein the phase current ripples are obtained by applying an inverse Park transformation to convert the current ripples from the rotating reference frame to the stationary reference frame.

13. The method of claim 11, further comprising:
determining, at the controller, a maximum phase current ripple for VSFPWM control of the three-phase inverter; and
determining, at the controller, the modified switching frequency based on the maximum phase current ripple and the initial switching frequency.

14. The method of claim 13, wherein the maximum phase current ripple for VSFPWM is a same maximum phase current ripple as for constant switching frequency pulse-width modulation (CSFPWM) control of the three-phase inverter.

15. The method of claim 13, wherein determining the modified switching frequency based on the maximum phase current ripple and the initial switching frequency includes:
comparing, at the controller, each phase current ripple to the maximum phase current ripple; and
determining, at the controller, the modified switching frequency based on the initial switching frequency and the comparing.

16. The method of claim 15, wherein determining the modified switching frequency based on the initial switching frequency and the comparing includes:
increasing, by the controller, the initial switching frequency when one of the phase current ripples is greater than or within a first predetermined threshold and the maximum phase current ripple; and
decreasing, by the controller, the initial switching frequency when one of the phase current ripples is less than the first predetermined threshold or a second predetermined threshold that is less than the first predetermined threshold.

17. The method of claim 11, further comprising constraining, by the controller, the modified switching frequency within a predetermined range of switching frequencies.

18. The method of claim 17, wherein a fundamental frequency of the IPMSM is substantially less than the predetermined range of switching frequencies.

19. The method of claim 17, wherein the predetermined range of switching frequencies is approximately 8.6 kilohertz (kHz) to 10 kHz.

* * * * *